United States Patent [19]

Gehin et al.

[11] Patent Number: 5,451,324
[45] Date of Patent: Sep. 19, 1995

[54] METHOD OF TREATING LIQUID EFFLUENTS CONTAINING ORGANIC COMPOUNDS

[75] Inventors: Guy M. Gehin; Oliver A. G. Caillault, both of Chalon-sur-Saone, France

[73] Assignee: Eastman Kodak Company, Rochester, N.Y.

[21] Appl. No.: 142,360

[22] PCT Filed: Mar. 2, 1993

[86] PCT No.: PCT/EP93/00470

§ 371 Date: Nov. 19, 1993

§ 102(e) Date: Nov. 19, 1993

[87] PCT Pub. No.: WO93/19011

PCT Pub. Date: Sep. 30, 1993

[30] Foreign Application Priority Data

Mar. 19, 1992 [FR] France .............................. 92 03562

[51] Int. Cl.⁶ .............................................. C02F 9/00
[52] U.S. Cl. ................................... 210/668; 210/669; 210/691; 210/694; 210/759
[58] Field of Search ............... 210/668, 669, 694, 759, 210/691

[56] References Cited

U.S. PATENT DOCUMENTS

| 3,655,343 | 4/1972 | Galeano | 210/758 |
| 3,767,572 | 10/1973 | Bober et al. | 210/756 |
| 4,332,687 | 6/1982 | Daignault et al. | 210/721 |
| 4,416,786 | 11/1983 | Knorre et al. | 210/746 |

FOREIGN PATENT DOCUMENTS

| 265709 | 5/1988 | European Pat. Off. |
| 2303766 | 10/1976 | France |
| 2534900 | 4/1984 | France |
| 63/39682 | 2/1988 | Japan |
| 7801323 | 2/1978 | Sweden |
| 85/02690 | 6/1985 | WIPO |

Primary Examiner—Ivars Cintins
Attorney, Agent, or Firm—John R. Everett

[57] ABSTRACT

The invention concerns a method of treating effluents in order to eliminate the organic compounds. The method comprises a primary oxidation stage with hydrogen peroxide in an alkaline medium, a secondary oxidation stage in a neutral medium and a subsequent absorption stage. The effluent thus treated can be discharged directly to drain. The invention can be applied in particular to effluents originating from photographic development baths.

11 Claims, 1 Drawing Sheet

METHOD OF TREATING LIQUID EFFLUENTS CONTAINING ORGANIC COMPOUNDS

The present invention relates to a method of treating liquid effluents containing organic compounds which are required to be destroyed or eliminated before disposing of them through the drains. Liquid effluents is intended to mean all kinds of waste water of industrial origin. This method can be applied very well to liquid photographic effluents in aqueous solution resulting from the processing of films and photographic papers.

There are many works on the treatment of liquid effluents such as color photographic development solutions or baths, the majority using peroxides, hydrogen peroxide or activated carbon. There are also more sophisticated treatment methods in which several reagents are used, separately or together.

In particular a method will be cited which uses a mixture of peroxides and ozone, described in U.S. Pat. No. 4,332,687, and which aims essentially at eliminating heavy metals.

The method in the Swedish Patent SE 7801323 will also be cited, which describes a two-stage treatment, first of all by means of hydrogen peroxide and then by means of activated carbon and/or an ion exchange resin. Instead of hydrogen peroxide, various types of oxidants can be used, alone or in combination, such as chlorine, chlorine dioxide, peroxides or ozone.

Another method will also be cited, described in the published patent application JP 63-039682, in which the effluents originating from photographic processing baths are condensed, and then the condensate is treated with inorganic peroxides in the presence of clay, and then with activated carbon.

Because of the increasing strictness of the standards relating to the disposal of effluents, it is necessary to continue to improve the effluent treatment methods. Moreover, the methods above-mentioned do not normally make it possible to dispose of the effluents thus treated into the environment without any other treatment, unlike the effluents treated by the method according to the invention.

The method according to the invention makes it possible to treat liquid effluents containing organic compounds, such as paraphenylene diamines or hydroquinone derivatives. These effluents are in particular color or black and white photographic developers. The method according to the invention also makes it possible to treat other organic compounds forming part of photographic film and paper processing solutions.

This method comprises the stages consisting of:
(a) treating the effluents with hydrogen peroxide in an alkaline medium;
(b) bringing the pH of the solution to between 6 and 9;
(c) treating the neutralised solution with a compound capable of having an oxidising action at a pH of between 6 and 9; and
(d) bringing the solution thus treated into contact with an absorbing agent.

The resulting liquid, after separation of the absorbent, is sufficiently purified to be discharged directly into the environment.

It will be understood that the method according to the invention consists of three principal stages, first of all a primary oxidation in an alkaline medium, then a secondary oxidation in a neutral medium and finally a subsequent absorption treatment.

The primary oxidation is carried out in a strongly alkaline medium (pH$\geq$10), advantageously at a pH of between 11 and 13, and aims to break up the organic molecules present into smaller entities.

The quantity and concentration of the hydrogen peroxide can vary to a great extent and are chosen according to the COD (chemical oxygen demand) of the solution to be treated and the degree of destruction desired. In practice, the quantity of oxygen contributed by the hydrogen peroxide expressed in grams per liter is between 0.5 and 3 times the COD of the bath to be treated expressed in grams per liter.

The neutralisation of the reaction product can be carried out, for example, with an acid such as phosphoric acid, prior to the secondary oxidation or along with it, by adding a quantity of acid sufficient to obtain a pH of between 9 and 6. In other words, stages (b) and (c) of the method can be merged.

As a reagent for the secondary oxidation, a peroxy compound can be used, for example peroxyacids or their salts, such as permonosulphuric acid, a permonosulphate, a perdisulphate or peracetic acid. Naturally, this peroxy compound must be a colorless product, active at a neutral pH and not comprising any ions capable of giving reaction products which are toxic or difficult to eliminate, such as chlorinated products. The preferred peroxy compounds are those enabling the remaining hydrogen peroxide to be activated, such as for example permonosulphates.

The purpose of the secondary oxidation is to destroy the molecules which have resisted the primary oxidation and to break down the entities formed in stage (a) into even smaller fragments, capable of being absorbed on an absorbing agent.

As an absorbing agent for the subsequent treatment, activated carbon or other products capable of absorbing the remaining organic products, such as porous or finely divided silicates (clay), zeolites or ion exchange resins, will advantageously be used. It is advantageous for this absorbing agent also to enable all or part of the residual oxidants, in particular the hydrogen peroxide, to be eliminated. Finally, this treatment causes the color of the effluent to disappear or to be highly attenuated. For economic reasons, it is preferred to use activated carbon.

The reaction time in each of the three stages depends on the effluent to be treated and the flowrates allowed by the device in which the method is implemented.

The advantage of the method according to the invention is its remarkable effectiveness at relatively low temperatures, for example between 25° and 80° C. Thus the primary oxidation can be carried out at between 40° and 55° C., advantageously around 50° C., and the secondary oxidation and subsequent absorption treatment between 25° and 40° C.

The full usefulness of such a method lies in the treatment of effluents originating from photographic development baths for obtaining color or black and white images, or else washing waters containing organic compounds.

As described in *Chimie et Physique Photographiques*, Glafkidès, 5th edition, Chapter VI, development baths comprise essentially, in aqueous solution:
1) an organic reducing agent (or developer) intended to reduce the silver halide, such as hydroquinone, metol, phenidone, para-aminophenol, diaminophenol, glycine, pyrogallol or paraphenylene diamine. A list of color developers will be found in *Research Disclosure* of December 1989, Item 308119, Chapter XX. For example, in the processing of reversible papers, developers of the CD3$^R$ type (4-amino-3-methyl-N-ethyl-N-beta-(methanesulfonamido)ethylaniline sesquisulphate monohydrate);

2) an alkaline solution for maintaining a high pH, such as sodium or potassium carbonate, sodium metaborate, borax, caustic soda or potash.

The developing solution can be also contain:

3) an oxidation preservative, usually anhydrous sodium sulphite which also acts as a development regulator;
4) an antifogging agent, usually potassium bromide or iodide, or else an organic antifogging agent such as p-nitro-benzimidazol nitrate, benzotriazol or diphenyltetrazol disulphide;
5) a solvent for silver halides, which can be the sulphite itself or potassium sulphocyanide, sodium hyposulphite, ammonium hydroxide solution, a thioalcohol or a mercapto-acid;
6) an anti-scaling agent, such as sequestering agents of the sodium hexametaphosphate or tetraphosphate type, or ethylene diamine tetracetic acid salts;
7) a wetting agent;
8) an anti silver deposition product which retards the formation of silver sludge such as dithiocarboxylic acid, benzopyrazol derivatives, organic polymers or polyacrylamides;
9) an anti-foaming agent:
10) an antiseptic;
11) an organic solvent, such as alcohol or glycol;
12) a tanning agent, such as glutaric aldehyde;
13) a permeability agent, such as benzylic alcohol or citrazinic acid.

The method according to the invention can be used in very large units treating thousands of liters per day or in small units such as small professional laboratories or mini-labs, which makes it possible to avoid the storage and collection of effluents.

The method can be implemented in any conventional equipment resistant to attacks from reaction conditions, in particular resistant to hydrogen peroxide in a highly alkaline environment, for example stainless steel of the INOX 316 L type. It is preferably implemented in a continuous operation device specially designed for this purpose, whose operating principle is described in the examples.

The invention will be understood better with reference to the following examples, given purely for illustrative purposes, examples in which the liquid effluent to be treated is a color photographic developing bath used for the E6 processing of reversible papers. This effluent comprises, in aqueous solution, the following substances:

| | |
|---|---|
| DEQUEST 2006$^R$* | 4.75 g/l |
| H$_3$PO$_4$ (85%) | 9.08 g/l |
| Anhydrous Na$_2$SO$_3$ | 6.75 g/l |
| Citrazinic acid | 0.56 g/l |
| KODAK CD3$^R$** developer | 10.45 g/l |
| KODAK HS-104$^R$ Silver Halide Solvent | 0.86 g/l |
| NaBr | 0.55 g/l |
| KI | 0.04 g/l |

-continued

| | |
|---|---|
| and KOH to obtain a pH of 11.97. | |

*Pentasodium salt of aminotris(methylphosphoric) acid
**4-amino-3-methyl-N-ethyl-N-beta-(methanesulfonamido) ethylaniline sulphate (3/2 H$_2$SO$_4$,H$_2$O)

Figure 1:
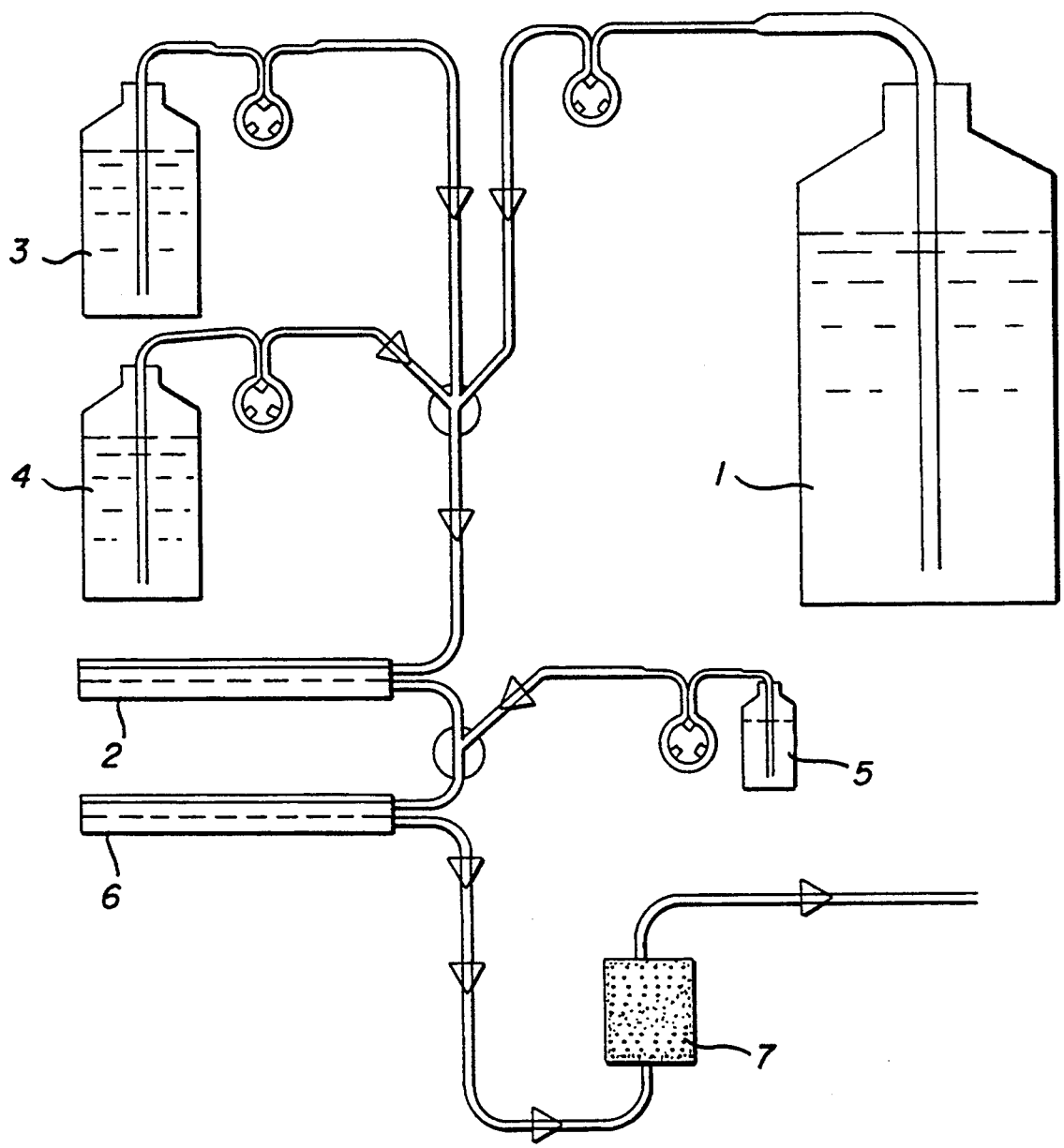
FIG. 1 shows a device for carrying out the invention.

The different stages in the treatment can be carried out continuously in a device comprising a primary oxidation reactor, a secondary oxidation reactor and one or more activated carbon cartridges, such as the one shown in FIG. 1.

The liquid effluent (1) circulates in the primary oxidation reactor (2) with a flow rate of the order of 3.0 liters per hour and the primary oxidation is carried out by admitting a 35% by weight solution of hydrogen peroxide (3) at a rate of 0.4 liters per hour and a 45% potash solution (4) at a rate of 0.4 liters per hour.

The configuration of the primary oxidation reactor is chosen so that the primary oxidation reaction time is of the order of 13 minutes.

At the output of the primary oxidation reactor, in the effluent thus treated, a neutralising solution, in this case a 28% by weight solution of H$_3$PO$_4$, is admitted by means of a pump with a flow rate of 0.59 liters per hour (Examples 1 and 2). In Examples 3 and 4, a 14% by weight solution of H$_3$PO$_4$ and potassium permonosulphate, sold under the trade mark CUROX® of the company INTEROX and dissolved in the acid at 150 g/l, are introduced together as a secondary oxidant (5). The flow rate is 1.18 liters per hour in the secondary oxidation reactor (6). The reaction time is, because of the configuration of the secondary oxidation reactor and the flow rates, of the order of 13 minutes. Finally, the effluent passes through a 2 liter double cartridge (7) filled with activated carbon sold under the trade mark Organic Removal Cartridge DO813® by BARNSTEAD-THERMOLYNE, at a flow rate of 4.5 to 5 liters per hour.

Table I summarises the characteristics of the effluent before and after the various treatments with regard to the CD3 content, the chemical oxygen demand (g/l), the optical density at 375 nm, which is representative of the presence of aromatic molecules, and the optical density at 450 nm, the optical density at 550 nm and the optical density at 650 nm, which indicate the coloration of the effluent.

In Example 1 (comparative), only the primary oxidation stage (a) and the neutralisation stage (b) are carried out.

In Example 2 (comparative), only stages (a), (b) and (d) are carried out. There is no secondary oxidation. This example is representative of the methods of the prior art.

In Example 3 (comparative), only stages (a), (b) and (c) are carried out; there is no subsequent absorption treatment on activated carbon.

In Example 4 according to the invention, all of the stages (a), (b), (c) and (d) of the treatment are carried out.

The disappearance of the CD3 will be noted in all the examples. The method according to the invention makes possible a notable reduction in the chemical oxygen demand and the aromatic molecules content, and decoloration of the effluents to a great extent. The method therefore enables the characteristics of the discharged effluents to be very greatly improved.

TABLE I

|  | CD3 g/l | COD | OD 375 nm | OD 450 nm | OD 550 nm | OD 650 nm |
| --- | --- | --- | --- | --- | --- | --- |
| Untreated effluent | 10.45 | 15 | 12.1 | 0.34 | 0.35 | 0.23 |
| Example 1 (comp.) | 0 | 9.76 | 2.09 | 1.81 | 0.79 | 0.58 |
| Example 2 (comp.) | 0 | 7.49 | 0.22 | 0.059 | 0.042 | 0.036 |
| Example 3 (comp.) | 0 | 8.88 | 0.893 | 0.497 | 0.067 | 0.029 |
| Example 4 (inv.) | 0 | 6.78 | 0.10 | 0.03 | 0.02 | 0.02 |

Example 5 provides additional results with regard to the biological oxygen demand (BOD5), the total organic carbon content (TOC), the total inorganic carbon content (TIC), mainly in the form of carbonates, the toxicity and the gaseous emissions, before and after the treatment according to the invention (stages a to d).

In this example, the untreated effluent has the same composition as the untreated effluent in the previous examples, but the COD and optical density characteristics are slightly different (see Table II). The toxicity is measured on daphnia in accordance with the French Standard NF T 90310.

Table II summarises the characteristics of the effluent before and after the treatment according to the invention.

It will be noted that the method according to the invention also makes it possible to decrease the biological oxygen demand and the toxicity of the effluent, which can then be discharged to drain whilst minimising the risk of pollution.

TABLE II

|  | Untreated effluent | Treated effluent (invention) |
| --- | --- | --- |
| CD3 g/l | 10.45 | 0 |
| COD g/l | 14.76 | 1.86 |
| BOD 5 g/l | 1.2 | 0.97 |
| TOC g/l | 3.46 | 0.81 |
| TIC g/l | 0.005* | 0.014* |
| OD 375 mm | 16.12 | 0.19 |
| OD 450 mm | 0.76 | 0.01 |
| OD 550 mm | 0.29 | 0.01 |
| OD 650 mm | 0.20 | 0.01 |
| Ecotoxicity EQUITOX/M3 | 400 | 145 |
| Gas emission |  |  |

TABLE II-continued

|  | Untreated effluent | Treated effluent (invention) |
| --- | --- | --- |
| bromomethane |  | not detected |
| dibromomethane |  | not detected |
| cyanogen bromide |  | not detected |
| hydrocyanic acid |  | not detected |

*limit of detection

We claim:

1. A method of treating liquid effluents containing color and/or black and white photographic developers, comprising the following stages:
   (a) treating the effluents with hydrogen peroxide at a pH greater than or equal to 10;
   (b) bringing the pH of the solution to between 6 and 9;
   (c) treating the neutralized solution with a compound capable of having an oxidizing action at a pH of between 6 and 9;
   (d) bringing the solution thus treated into contact with an agent capable of absorbing organic products in the solution; and
   (e) separating the absorbing agent from the solution.

2. A method according to claim 1, in which the pH of the alkaline medium of stage (a) is between 11 and 13.

3. A method according to claim 1, in which, in stage (c), the compound capable of having an oxidisation action at a pH of between 6 and 9 is a peroxy compound.

4. A method according to claim 3, in which the peroxy compound is a peroxy acid or a peroxy acid salt.

5. A method according to claim 4, in which the peroxy compound is permonosulphuric acid, a permonosulphate, a perdisulphate, or peracetic acid.

6. A method according to claim 5, in which the peroxy compound is permonosulphate.

7. A method according to claim 1, in which the absorbing agent of stage (d) is a porous or finely divided silicate, a clay, a zeolite, an ion exchange resin or activated carbon.

8. A method according to claim 7, in which the absorbing agent is activated carbon.

9. A method according to claim 1, in which stages (a) to (d) are carried out at temperatures of between 25° and 80° C.

10. A method according to claim 1 in which the effluents contain diamine paraphenylenes.

11. A method according to claim 1 in which the effluents contain hydroquinones and hydroquinone derivatives.

* * * * *

IN THE UNITED STATES PATENT AND TRADEMARK OFFICE
CERTIFICATE OF CORRECTION

PATENT NO.: 5,451,324
DATED: September 19, 1995
INVENTOR(S): Guy M. Gehin, et al.

It is certified that an error appears in the above-identified patent and that said Letters Patent is hereby corrected as shown below:

On title page,

At [75] Inventors: "Oliver A. G. Caillault" should read --Olivier A. G. Caillault--.

Signed and Sealed this

Fifth Day of December, 1995

Attest:

BRUCE LEHMAN

*Attesting Officer*  *Commissioner of Patents and Trademarks*